(12) United States Patent
Certuse

(10) Patent No.: US 8,126,660 B2
(45) Date of Patent: Feb. 28, 2012

(54) METHOD AND SYSTEM FOR DETERMINING RESIDENTIAL FUEL USAGE

(76) Inventor: John Certuse, Attleboro, MA (US)

( * ) Notice: Subject to any disclaimer, the term of this patent is extended or adjusted under 35 U.S.C. 154(b) by 362 days.

(21) Appl. No.: 12/491,328

(22) Filed: Jun. 25, 2009

(65) Prior Publication Data

US 2010/0017149 A1    Jan. 21, 2010

Related U.S. Application Data

(60) Provisional application No. 61/081,859, filed on Jul. 18, 2008.

(51) Int. Cl.
*G06F 7/00* (2006.01)
*G06F 19/00* (2011.01)

(52) U.S. Cl. .................. 702/45; 431/79; 702/55

(58) Field of Classification Search ............. 702/45, 702/50, 99, 100, 130, 131, 136, 184, 187; 431/79
See application file for complete search history.

(56) References Cited

U.S. PATENT DOCUMENTS 7,127,361 B1    10/2006  Batey et al.
7,229,278 B1 *   6/2007  Newberry ..................... 431/79

* cited by examiner

*Primary Examiner* — John H Le
(74) *Attorney, Agent, or Firm* — Barlow, Josephs & Holmes, Ltd.

(57) ABSTRACT

A method and system that accurately predicts fuel consumption rates in a residential structure is provided. The present invention more accurately determines the amount of fuel required to maintain a residential structure at a consistent temperature, thereby allowing identification of various system anomalies that may occur over time. Further, the method and system accounts for a number of fuel usage variables such as pilot light and domestic hot water usage in a manner that allows improved accuracy in determining the amount of fuel required to maintain a residential structure at a consistent temperature, thereby allowing identification of various system anomalies that may occur over time.

14 Claims, 4 Drawing Sheets

METHOD AND SYSTEM FOR DETERMINING RESIDENTIAL FUEL USAGE

CROSS-REFERENCE TO RELATED APPLICATIONS

This application is related to and claims priority from earlier filed US Provisional Patent Application No. 61/081,859, filed Jul. 18, 2008.

BACKGROUND OF THE INVENTION

The present invention relates generally to a method and system for predicting fuel consumption rates in a residential structure. More specifically, the present invention provides a method and system for more accurately determining the amount of fuel required to maintain a residential structure at a consistent temperature, thereby allowing identification of various system anomalies that may occur over time.

It is well known in the prior art that the fuel usage required for the maintenance of a constant temperature in a residential structure is an inverse function relative to the changes in the ambient outdoor temperature. In the most simplistic terms, as the ambient outdoor temperature decreases, the fuel consumption required to maintain the interior of the residential structure at a consistent temperature increases. Since this relationship can be calculated, home heating fuel suppliers such as fuel oil and propane companies have developed formulas and systems to predict the rate at which a residential building will consume fuel. This calculation then lets the fuel supplier schedule automatic deliveries to replenish the fuel storage tanks before they are empty. Typically these formulas rely first on the calculation of heating degree-days, which are generally defined as 65° F. minus the average daily temperature and then on the calculation of the fuel usage of a particular structure per heating degree day. Therefore, in order to accurately predict the fuel usage of the structures that they service, the fuel suppliers collect information on outdoor air temperature that is in turn used to calculate the heating degree-days. For example, if the average outside temperature for the day is 28° F., then the number of heating degree-days for that day is 65°-28° or 37 heating degree-days.

As stated above, once the heating degree-days are known, the second factor in the fuel consumption rate is the rate at which a given structure consumes fuel per heating degree-day. The consumption rate relative to the total number of heating degree-days is typically determined based on historical observation. In these calculations, the fuel consumption or burn rate is referred to as a K factor and is defined as heating degree-days per unit of fuel. Once a supplier has knowledge of the heating degree-days and the K factor of the residential structure, fuel suppliers can estimate when fuel deliveries are needed by evaluating the remaining fuel in the tank as heating degree days accumulate during the heating season. Typically, fuel deliveries are scheduled based on tracking simple heating degree-days, which reflect how much heating is required based on outdoor air temperature. As the outdoor temperature drops, heating degree-days increase and more fuel is used.

It is of note that this system can also be used historically to track changes in fuel burn rates relative to weather conditions in order to determine anomalies in the residential heating pattern. For example, a historic review of the fuel usage relative to heating degree-days can provide information that indicates an excessive thermostat turn back or a mechanical failure that prevented the structure from being heated for a period of time. The difficulty however is that in employing this method for a forensic examination or investigative tool, there are variables that are not accounted for that ultimately undermine the overall credibility of the analysis.

There is therefore a need for a method and system to accurately predict consumption rates in a residential structure. There is a further need for a method and system that can more accurately determine the amount of fuel required to maintain a residential structure at a consistent temperature, thereby allowing identification of various system anomalies that may occur over time. There is still a further need for a method and system that accounts for a number of fuel usage variables such as pilot light and domestic hot water usage in a manner that allows improved accuracy in determining the amount of fuel required to maintain a residential structure at a consistent temperature, thereby allowing identification of various system anomalies that may occur over time.

BRIEF SUMMARY OF THE INVENTION

In this regard, the present invention provides for a method and system that allows the accurate prediction of fuel consumption rates in a residential structure in a manner that allows identification of various system anomalies. In operation the method and system employs a baseline calculation that determines an assumed fuel burn rate for a residential structure. Once the baseline is determined a user can compare the baseline to the actual fuel consumed during a period of time to identify variations in consumption that can be further analyzed to determine the cause of the variations. For example, the analysis of such variations may indicate that the fuel ran out, the system failed, the existence of a fuel leak, an opening in the building envelope, etc.

In operation, the method and system of the present invention provides for a graphic depiction of the actual fuel burn rate as compared to the calculated K factor for a given structure. The K-factor is employed because as stated above, the K factor provides an inverse relationship with the ambient temperature where the actual burn rate provides a direct relationship between the fuel usage and the ambient outdoor temperature. In this regard, the actual amount of fuel consumed in a period is divided by the heating degree-days to determine periodic burn rates. Applying this fuel usage analysis to homes where the temperatures are known to be consistent results in a signature graph that shows flat plateaus throughout the winter months that coincide with the same burn rate consistently throughout subsequent winters. A review of the graph shows that should there be a sudden mechanical breakdown, the burn rate falls from its normal plateau. Similarly, if the thermostat is excessively setback, the entire plateau itself is lowered.

In addition, the method of the present invention includes a corrective calculation to remove variables that previously were employed to undermine the credibility of the above analysis. In particular, the method of the present invention also employs an adjustment factor to identify the amount of fuel used for domestic hot water uses and for the fuel consumed by pilot flame usage in order to provide a clearer depiction of the actual fuel consumed (or not consumed) to maintain the residential structure at a consistent temperature. Accordingly, the method of the present invention provides as follows:

1) Identify winter burn rate through analysis listed above;
2) Identify last heating season fuel delivery date;
3) Count number of heating degree days between last heating season fuel delivery date to next non-heating season fuel delivery;
4) Identify amount of fuel delivered in non-heating season fuel delivery;

5) Calculate the fuel from the last fuel delivery that went to heat house in last days of heating season based on the winter burn rate X heating degree days between winter and summer delivery;

6) Determine the amount of fuel that supplied heat based on the fuel delivered; and 7) Calculate daily fuel consumed for domestic water and pilot flame usage.

Once a value is known of the amount of fuel that is used daily for domestic water usage and pilot flame usage, many arguments and assumptions can be overcome. For example, should a homeowner state that the reduction is the result of a three-week trip away from home, the fuel consumption calculation can be adjusted based on a three-week period where no domestic hot water was used. This allows a highly accurate picture of the fuel employed for heating only thereby eliminating attacks on the credibility of the calculation.

It is therefore an object of the present invention to provide a method and system that accurately predicts consumption rates in a residential structure. It is a further object of the present invention to provide a method and system that can more accurately determine the amount of fuel required to maintain a residential structure at a consistent temperature, thereby allowing identification of various system anomalies that may occur over time. It is still a further object of the present invention to provide a method and system that accounts for a number of fuel usage variables such as pilot light and domestic hot water usage in a manner that allows improved accuracy in determining the amount of fuel required to maintain a residential structure at a consistent temperature, thereby allowing identification of various system anomalies that may occur over time.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
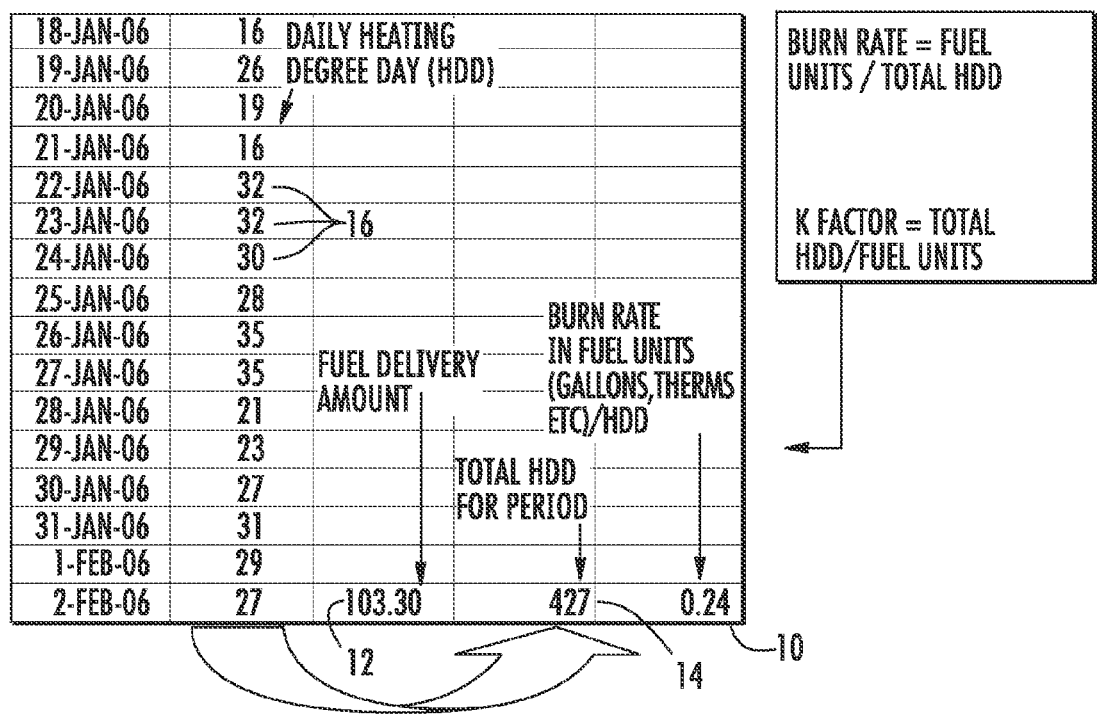
FIG. 1 is a chart illustrating the calculation of the burn rate in accordance with the present invention.

Now referring to the drawings, the method and system of the present invention is shown and generally illustrated in the figures. As stated above, the present invention provides for a method and system that allows the accurate prediction of fuel consumption rates in a residential structure in a manner that allows identification of various system anomalies. In operation the method and system employs a baseline calculation that determines an assumed fuel burn rate for a residential structure and then compares the baseline to the actual fuel consumed during a period of time to identify variations in consumption that can be further analyzed to determine the cause of the variations.

In operation, the method and system of the present invention provides first for the calculation of the burn rate for a given structure. As depicted in the chart at FIG. 1, the burn rate 10 is determined by dividing the total amount of fuel units delivered 12 to the structure over a given period divided by the total heating degree days 14 during the same period. In other words, the daily heating degree-days 16 for a given period are summed and the total fuel units 12 for that period are divided by the sum of heating degree-days 14 to arrive at a burn rate value 10. This calculation is performed historically for the structure to provide a graph of the burn rate for the structure over time. Since this burn rate calculation is a function of the heating degree-days in a given time period it can be noted that, regardless of the severity of winter weather, if a temperature in the building is held constant between fuel deliveries or meter readings, a consistent burn rate 10 will result.

Figure 2:
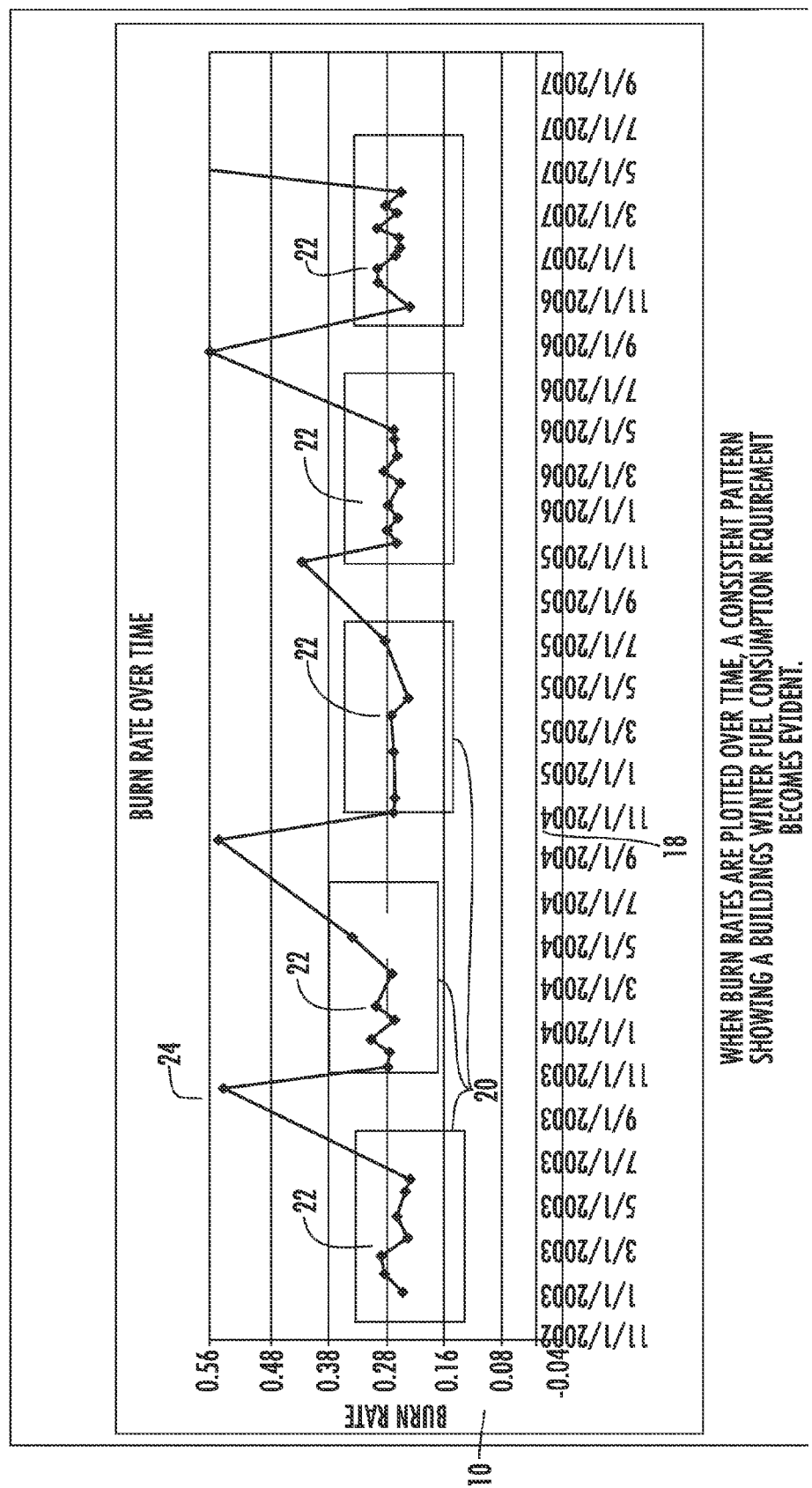
FIG. 2 is a graph of the calculated burn rates depicted over time.
Figure 3:
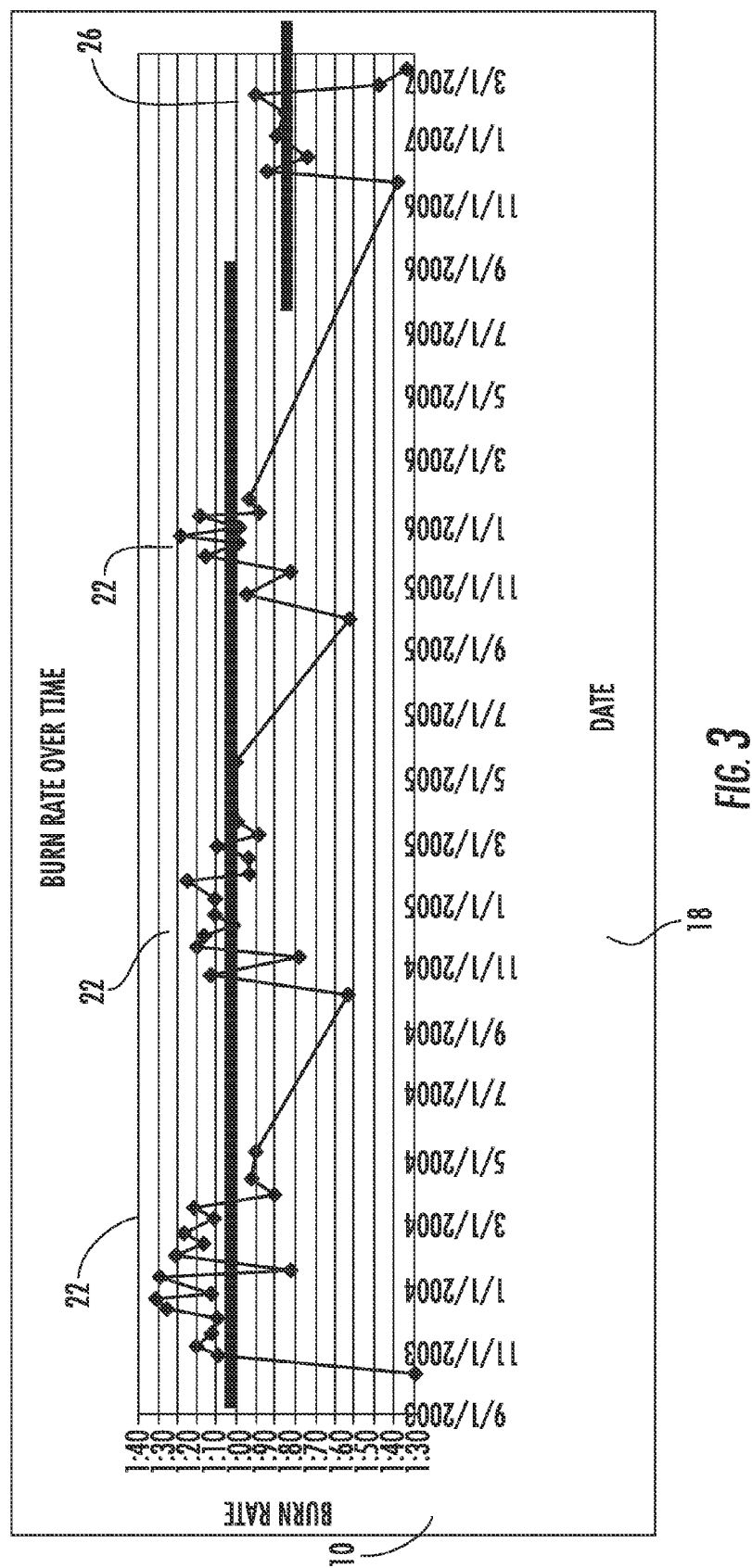
FIG. 3 is a graph of the calculated burn rates over time illustrating a thermostat set back.
Figure 4:
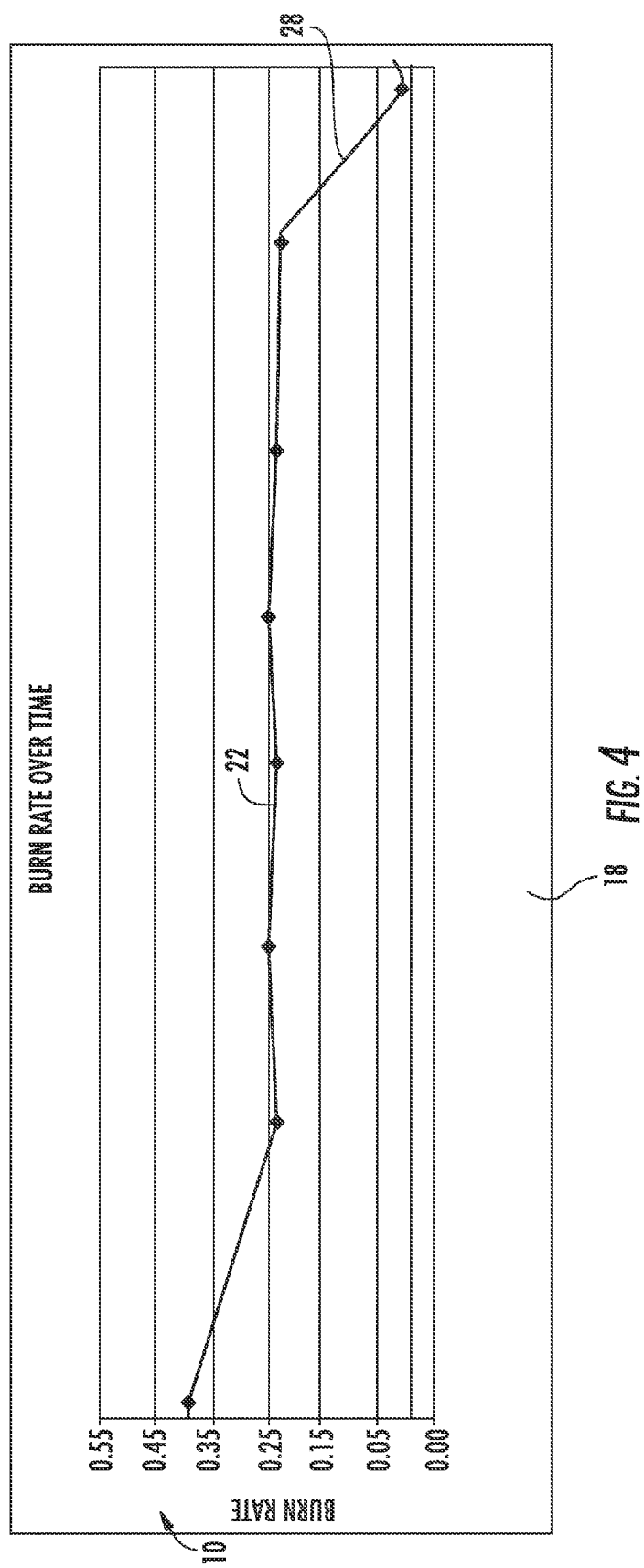
FIG. 4 is a graph of the calculated burn rates over time illustrating a mechanical failure.

In applying this fuel usage analysis to homes where the temperatures are known to be consistent the results produce a signature graph as depicted at FIG. 2. The graph shows the burn rate 10 along the y-axis and sequential days along the x-axis. It can be seen in this graph that a consistent pattern develops such that winter fuel consumption requirements, depicted in the boxed regions 20, become evident. The graph shows flat plateaus 22 throughout the winter months that coincide with the same burn rate 10 consistently throughout subsequent winters. It can be further noted that the peaks 24 in the burn rates 10 during "non heating" months can be ignored as they simply show a fuel delivery in time periods where there was a low accumulation of heating degree-days resulting in this graph characteristic. A review of the graph, as depicted at FIG. 3, further shows that should the thermostat be setback by an excessive amount, the plateau during 26 the setback period itself is lowered as compared to its normally predicted plateau level 22. Similarly, should there be a sudden mechanical breakdown, as depicted at FIG. 4, the burn rate 10 falls sharply 28 from its normally predicted plateau level 22.

In the case of a lowered plateau 26 depiction, as shown at FIG. 3, the thermostat setback can be easily calculated. According to the 1997 Department of Energy's Residential Energy Consumption Survey, the following fuel savings can be obtained for every degree Fahrenheit of thermostat reduction: Natural Gas 5%, Electricity 6%, Fuel Oil 4%, Kerosene 5% and LP Gas 5%. By determining the total percentage of fuel savings through a comparison of the normal burn rate 22 versus the reduced burn rate 26, the total setback of the thermostat in terms of degrees can be determined. For example if the normal burn rate 22 in a house using natural gas was 1.50 at a thermostat setting of 70° F. and the lowered burn rate 26 is 0.5 it can be seen that there was 66% savings in fuel consumption. Based on the Department of Energy Survey this 66% savings translates to a 13.33° F. thermostat setback or an actual thermostat setting of approximately 57° F.

In addition to the creation of the burn rate graphic depiction above, the method of the present invention includes a corrective calculation to remove variables that previously were employed to undermine the credibility of the overall analysis. In particular, the method of the present invention also employs an adjustment factor to identify the amount of fuel used for domestic hot water uses and for the fuel consumed by pilot flame usage in order to provide a clearer depiction of the actual fuel consumed (or not consumed) during the time period of interest in order to maintain the residential structure at a consistent temperature. In determining the impact of domestic hot water usage the fuel consumed during the non-heating season divided by the number of days during the non-heating season determine the average amount of fuel used in producing domestic hot water, provided the structure is occupied during the time periods in question.

A further correction employed within the scope of the present invention is a correction factor that is applied to account for the fuel used in a gas fired house by the pilot flame on gas appliances. This correction is calculated by determining the hourly flow rate for each pilot flame and converting it to a flow rate over a 24-hour period. This 24-hour flow rate is then converted to gas usage per day and multiplied by the number of days in the period in question. In this manner the burn rate for fuel can be adjusted to account for pilot flame fuel use.

Once a value is known of the amount of fuel that is used daily for domestic water usage and pilot flame usage, many arguments and assumptions can be overcome. For example, should a homeowner state that the reduction is the result of a three-week trip away from home, the fuel consumption calculation can be adjusted based on a three-week period where no domestic hot water was used. This allows a highly accurate picture of the fuel employed for heating only thereby eliminating attacks on the credibility of the calculation.

Accordingly, the method of the present invention provides as follows:
1) Identify winter burn rate through analysis listed above;
2) Identify last heating season fuel delivery date;
3) Count number of heating degree days between last heating season fuel delivery date to next non-heating season fuel delivery;
4) Identify amount of fuel delivered in non-heating season fuel delivery;
5) Calculate the fuel from the last fuel delivery that went to heat house in last days of heating season based on the winter burn rate X heating degree days between winter and summer delivery;
6) Determine the amount of fuel that supplied heat based on the fuel delivered; and
7) Calculate daily fuel consumed for domestic water and pilot flame usage.

It can therefore be seen that the present invention provides a method and system that accurately predicts consumption rates in a residential structure by accurately determining the amount of fuel required to maintain a residential structure at a consistent temperature, thereby allowing identification of various system anomalies that may occur over time. Further, the method and system of the present invention accounts for a number of fuel usage variables such as pilot light and domestic hot water usage in a manner that allows improved accuracy in determining the amount of fuel required to maintain a residential structure at a consistent temperature, thereby allowing identification of various system anomalies that may occur over time. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of creating a visual depiction of variations in predicted fuel usage for heating a structure comprising the steps of:
   calculating an historic winter burn rate required to maintain said structure at a constant temperature and providing a graphic depiction thereof;
   determine a number of heating degree days since a last fuel delivery;
   determine an amount of fuel in the last fuel delivery;
   divide the amount of fuel by the heating degree-days to obtain an actual burn rate;
   adjust the actual burn rate for fuel used in domestic hot water production;
   adjust the actual burn rate for pilot flame fuel use;
   providing a graphic depiction of the adjusted actual burn rate; and
   comparing the graphic depictions of the adjusted actual burn rate to the historic winter burn rate in order to determine if a discrepancy exists that indicates a failure in the heating of the structure.

2. The method of claim 1, wherein the historic burn rate is calculated by dividing total amount of fuel units delivered to the structure over a given period divided by the total heating degree days during the same period.

3. The method of claim 1, wherein the pilot flame fuel use is calculated by determining an hourly flow rate for each pilot flame within the structure and converting the hourly flow rate to a daily flow rate by multiplying by 24 hours.

4. The method of claim 1, the fuel used for domestic hot water is determined by determining an amount of fuel consumed during a non-heating season divided by a number of days during the non-heating season to determine an average amount of fuel used daily in producing domestic hot water.

5. The method of claim 4, wherein the adjustment to the actual burn rate for fuel used in domestic hot water production is applied only for the number of days the structure is occupied.

6. The method of claim 1, further comprising:
   compare the adjusted actual burn rate to the historic winter burn rate to obtain a percentage change in actual burn rate;
   translating the percentage change in burn rate into a thermostat degree setback value.

7. The method of claim 1, wherein the fuel is oil.

8. The method of claim 1, wherein the fuel is natural gas.

9. The method of claim 1, wherein the fuel is LP gas.

10. The method of claim 1, wherein the historic burn rate and the actual burn rate are depicted on a graph as a function of time.

11. The method of claim 10, wherein the graph depicts historic winter burn rates as plateaus in the graph.

12. The method of claim 11, wherein plateaus in the graph at a lower level indicate setbacks in thermostat settings.

13. The method of claim 11, wherein sharp drops in the graph indicate system failure.

14. The method of claim 13, wherein the system failure is selected from the group consisting of: fuel shut off, lack of fuel, system shut off, system breakage and combinations thereof.

* * * * *